United States Patent

Rose et al.

[15] 3,658,561

[45] Apr. 25, 1972

[54] TREATMENT OF SAUSAGE CASING FOR EASY PEELING

[72] Inventors: Henry J. Rose, 5 Logan Terrace; Albin F. Turbak, 215 Denvale, both of Danville, Ill. 61832

[22] Filed: Sept. 22, 1969

[21] Appl. No.: 860,096

[52] U.S. Cl.............................................99/176, 117/144
[51] Int. Cl........................................................H22c 13/00
[58] Field of Search.......................99/176, 175, 10; 117/144

[56] References Cited

UNITED STATES PATENTS

| | | | |
|---|---|---|---|
| 2,621,135 | 12/1952 | Brillhart | 117/144 |
| 2,985,545 | 5/1961 | Leavitt | 99/176 UX |
| 3,262,789 | 7/1966 | Broumand | 99/169 X |
| 3,307,956 | 3/1967 | Chiu | 99/175 X |
| 3,451,827 | 6/1969 | Bridgeford | 99/176 |
| 3,533,808 | 10/1970 | Cameron | 99/176 |

FOREIGN PATENTS OR APPLICATIONS

| | | | |
|---|---|---|---|
| 590,202 | 1/1960 | Canada | 117/144 |
| 1,009,587 | 11/1965 | Great Britain | 99/176 |

*Primary Examiner*—Frank W. Lutter
*Assistant Examiner*—Robert Halper
*Attorney*—Neal J. Mosely and David V. Munnis

[57] ABSTRACT

Sausages, such as frankfurters and bolognas, formed in synthetic casings are more easily peeled by soaking the casings, either prior to or after stuffing with a sausage emulsion, with a soluble non-toxic quaternary ammonium salt which will interact with components of the sausage emulsion to modify the surface characteristics of the sausage. The quaternary ammonium salt may be applied as an aqueous solution to frankfurter sausage casings at the time of manufacture just prior to drying the casing. The quaternary ammonium salt, however, may be applied more generally as a solution to all types of casing either just prior to or at some point after stuffing of the casing with sausage paste or emulsion. In the case of larger casings of a type used for bolognas the quaternary ammonium compounds may be applied to the soak water. These quaternary ammonium compounds may also be applied as an external soak bath for the stuffed sausages, both of the frankfurter and bologna types, or in the shower applied to soak the casings prior to peeling, to saturate the casing and provide a uniform application of the quaternary ammonium salt to interact with the sausage paste or emulsion components at the surface contacting the casing. The use of casings soaked or impregnated with these quaternary ammonium salts facilitates removal of the casing from the smoked and/or cooked sausages at a time when the untreated casing could not be peeled from the sausage.

7 Claims, No Drawings

TREATMENT OF SAUSAGE CASING FOR EASY PEELING

BACKGROUND OF THE INVENTION

1. Field of the Invention

In the preparation of sausages of various types, ranging from smaller sausages such as frankfurters and viennas up to large sausages such as bolognas, the sausage meat is normally extruded into a tubular casing for processing. In the early days of the packing industry, sausages were prepared using natural casings. About 40 years ago, casings were developed of regenerated cellulose which have been used in the preparation of sausages of all sizes. Clear, thin-walled, cellulosic casings were used primarily in the preparation of frankfurters and viennas. Larger diameter, heavy-walled, cellulosic casings, both clear and fibrous-reinforced, were used in the manufacture of larger sausages of the bologna type. In the manufacture of both large and small sausages, a major problem has been the stripping of the sausage casing from the sausage after it has been smoked and cooked by the meat packer. This problem has been especially great in the case of frankfurter sausages because of the large number of sausages processed.

In the preparation of frankfurters and other small sausages, a sausage paste or emulsion is extruded from a stuffing horn into a shirred sausage casing. The shirred casing will normally contain from 80 to 160 feet of casing in a shirred length of 10 to 20 inches. The sausage paste or emulsion is extruded into the casing at a high speed with the result that the entire length of the casing is filled with sausage emulsion in a few seconds. As the casing is filled with sausage emulsion it passes into a linking device which twists the casing to form individual sausage links. The encased lengths of sausage are then cooked and smoked and are stored in a refrigerated room for about 24 hours prior to peeling. After extended storage in the chill room the encased sausages are removed into a peeling room which is maintained at a relatively high humidity. The chilled sausage has a considerable amount of moisture condensed on its surface removing from the chill room which facilitates removal of the casing from the individual sausages. The sausages are passed through a commercial peeling machine which cuts open the casing without cutting the encased meat and removes the casing from the sausage. Sausages which are not separated from the casing by the automatic peeling machinery must be separated by hand which adds to the cost of processing. Normally, if a particular string of sausage is difficult to peel it is returned to the chill room and cooled for an additional period of time to allow the meat emulsion to set up more thoroughly and facilitate casing removal. In the processing of frankfurters and other small sausages a major item of cost is the removal of casing from the finished sausages, particularly the cost of a high inventory in the chill room and the cost of hand peeling sausages which do not peel cleanly on the automatic peeling machinery.

2. Description of the Prior Art

The prior art has been concerned with the problem of improving the peelability of synthetic casings from sausages for many years. The attempted solutions to the problem suggested by the prior art have mainly involved the application of various coatings to the inner surface of the synthetic casings to permit the casings to be peeled more readily from the sausages. Weingand U.S. Pat. No. 2,709,138 discloses an internal release coating of a fatty isocyanate. Firth U.S. Pat. No. 3,106,471 discloses release coatings of fatty ketenes. Underwood U.S. Pat. No. 2,901,358 discloses release coatings of stearato chromic chloride chemically combined on the inner surface of the casing. Chiu U.S. Pat. No. 3,307,956 discloses release coatings of water soluble silicones. Turbak U.S. Pat. No. 3,442,663 discloses release coatings of water insoluble polymerized silicones applied internally as a polymerized methyl hydrogen siloxane. Bridgeford U.S. Pat. No. 3,451,827 discloses release coatings of lactic acid, calcium lactate, trisodium hexametaphosphate, aluminum sulfate, potassium aluminum sulfate, lecithin diammonium phosphate, carboxymethyl cellulose, silicone oil, calcium phytate, inositol, glycerophosphoric acid, acetylated monoglycerides, methyl cellulose, or cetyl alcohol applied internally to the casing during the mechanical shirring of the casing.

The prior art, as exemplified by the aforementioned patents, has had only limited success in providing easily peelable synthetic casings for frankfurters and other small size sausages. The various coatings disclosed in the prior art are applied to the interior of large size casings, such as those used for bolognas, etc., by an internal slug coating technique. This coating technique, however, is not applicable to the interior coating of frankfurter type synthetic sausage casings because of the very small diameter of such casings and the speed of manufacture which makes it difficult to introduce a coating liquid inside the casing. Coating materials such as those disclosed in U.S. Pat. No. 3,307,956 may be added from the outside of the casing in aqueous solution. However, the silicone coating materials which are water soluble in aqueous alkali are not approved coating materials for use with meat or other food products. Coating materials of the type disclosed in U.S. Pat. Nos. 3,442,663 and 3,451,827 may be applied to small diameter casings during mechanical shirring on a shirring machine. The application of coatings during shirring, however, is somewhat irregular and often results in an interior coating which is incomplete in coverage and quite variable in thickness.

SUMMARY OF THE INVENTION

This invention is based upon the discovery that artificial sausage casings, particularly casings of regenerated cellulose, both of the clear cellulose and fibrous-reinforced types, may be more easily peeled from sausages processed in the casing when thoroughly impregnated or soaked with solutions of quaternary ammonium salts which interact with components of the sausage paste or emulsion to modify the surface properties of the sausage and to permit easy release of the casing. The quaternary ammonium salts may also be applied as a solution to frankfurter type casings after completion of all chemical processing and washing and just prior to drying of the casing. Where the quaternary ammonium salts are added to frankfurter casings during manufacture, the solution must be at a pH greater than 4 so that the casing is not damaged on extended storage. The compounds used in treating the casing are non-toxic quaternary ammonium salts which remain soluble after the casing has been dried and shirred. The quaternary ammonium salts which are saturated in and impregnated throughout the casing are extractable from the casing into the outer surface layer of the sausage paste or emulsion processed in the casing. Under these conditions the impregnated materials interact with proteinaceous or fatty or other components of the sausage emulsion or paste to modify the surface properties of the sausage and permit easy peeling of the casing from the sausage.

The impregnation of quaternary ammonium salts in the casing during manufacture is more or less limited to frankfurter type casings. The process of this invention, however, is one which is generally applicable to frankfurter casings and to larger sausage casings of the type used in the processing of bolognas and other larger sausages. In applying this invention to provide easy release of both small and large clear cellulosic casings or fibrous casings, the soluble quaternary ammonium salts used to impregnate the casings are applied to the casing in the soak water used to soften the casing prior to stuffing with the sausage paste or emulsion or the stuffed sausage may be soaked for a short time in a solution of the quaternary ammonium salts to provide a sufficient amount at the surface of the casing to interact with the sausage emulsion or paste components and provide for easy release of the casing. Similarly, solutions of the quaternary ammonium salts may be applied to encased frankfurters after stuffing and linking to soak the casings with the quaternary ammonium salts in an amount sufficient to interact with components of the sausage paste or emulsion to provide for easy peeling of the casing therefrom. The solutions of quaternary ammonium salts may also be used in the shower applied to stuffed and linked frankfurter casings to facilitate peeling of the casing from the frankfurters.

DESCRIPTION OF THE PREFERRED EMBODIMENTS

In the manufacture of regenerated cellulose sausage casings, viscose is extruded through an annular die into a coagulating and regenerating bath to produce a tube of regenerated cellulose. The tube is subsequently washed, plasticized with glycerin, and dried while inflated under a substantial air pressure for size control. After drying, the casing is wound on reels and subsequently shirred on high speed shirring machines, such as those described in U.S. Pat. Nos. 2,010,626; 2,583,654; 2,722,714; 2,722,715; 2,723,201; etc. Reinforced cellulose casing, also known as fibrous casing, is prepared by forming a tube of a long fiber hemp paper, or the like, impregnating the paper tube with viscose, and regenerating cellulose in and on the paper tube. The viscose-impregnated tube is passed into a coagulating and regenerating bath and then subsequently washed, plasticized with glycerin and dried under air pressure. Fibrous casing is used largely for the production of large sausages such as bolognas. Large diameter clear unreinforced regenerated cellulose casing is also used in the production of large bologna type sausages. Fibrous casing and the large clear cellulosic casings are normally sold as flat stock either in the form of reel stock or cut into pieces of predetermined length.

We have found that cellulosic casings, and other synthetic sausage casings are more easily peeled from sausages processed therein if thoroughly soaked with non-toxic quaternary ammonium salts. In the case of small diameter clear cellulosic casings of the type used in the production of frankfurter sausages, the soluble quaternary ammonium salts are applied to the casing either in the glycerin bath or in a separate bath following the glycerin bath just prior to drying. The quaternary ammonium salts may also be applied to soak baths for larger diameter clear and fibrous casings or can be applied to soak baths for sausages encased in the casings, whether of the large or small size. The quaternary ammonium salts can also be applied to small sausages in the form of a shower of the solution applied to the encased sausages as a substitute for the acid shower which is often used in the processing of frankfurter sausages.

In carrying out this invention any soluble non-toxic quaternary ammonium salts may be used which will interact with the components of the sausage paste or emulsion to modify the surface characteristics of the sausage at the interface between the sausage and the casing. Typical quaternary salts which may be used include the following:

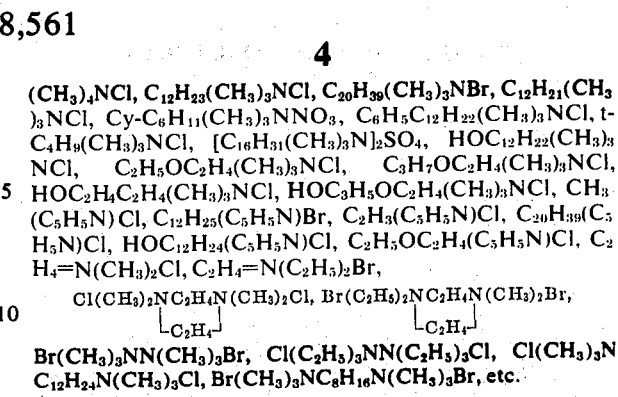

Where (a) X is a non-toxic salt anion such as chloride, bromide, sulfate, nitrate, acetate, citrate, etc., (b) $n$ is the valence of X, (c) R and $R^1$ are $C_1 - C_{20}$ alkyl, alkenyl, cycloalkyl, or aryl alkyl, including straight chain or branched chain forms, both unsubstituted and including alkyl, cycloalkyl, aryl, halo-, hydroxy-, ethoxy-, or propoxy- substituents, and (d) $R^2$ is a divalent radical containing 2–20 atoms, including $C_2$–$C_{20}$ alkylene or alkenylene, unsubstituted or containing inert substitutents.

Specific examples of said quaternary salts include $(CH_3)_4NCl$, $C_{12}H_{23}(CH_3)_3NCl$, $C_{20}H_{39}(CH_3)_3NBr$, $C_{12}H_{21}(CH_3)_3NCl$, Cy-$C_6H_{11}(CH_3)_3NNO_3$, $C_6H_5C_{12}H_{22}(CH_3)_3NCl$, t-$C_4H_9(CH_3)_3NCl$, $[C_{16}H_{31}(CH_3)_3N]_2SO_4$, $HOC_{12}H_{22}(CH_3)_3NCl$, $C_2H_5OC_2H_4(CH_3)_3NCl$, $C_3H_7OC_2H_4(CH_3)_3NCl$, $HOC_2H_4C_2H_4(CH_3)_3NCl$, $HOC_3H_5OC_2H_4(CH_3)_3NCl$, $CH_3(C_5H_5N)Cl$, $C_{12}H_{25}(C_5H_5N)Br$, $C_2H_3(C_5H_5N)Cl$, $C_{20}H_{39}(C_5H_5N)Cl$, $HOC_{12}H_{24}(C_5H_5N)Cl$, $C_2H_5OC_2H_4(C_5H_5N)Cl$, $C_2H_4=N(CH_3)_2Cl$, $C_2H_4=N(C_2H_5)_2Br$, $Cl(CH_3)_2NC_2H_4N(CH_3)_2Cl$, $Br(C_2H_5)_2NC_2H_4N(CH_3)_2Br$, (with $C_2H_4$ bridge)

$Br(CH_3)_3NN(CH_3)_3Br$, $Cl(C_2H_5)_3NN(C_2H_5)_3Cl$, $Cl(CH_3)_3NC_{12}H_{24}N(CH_3)_3Cl$, $Br(CH_3)_3NC_8H_{16}N(CH_3)_3Br$, etc.

In demonstrating the efficacy of this invention, casings treated in accordance with the invention are compared with untreated controls. In the preparation of frankfurter sausages, the stuffed sausages are soaked in a solution of one of the aforementioned quaternary ammonium salts after cooking. The sausages may be soaked prior to smoking and chilling or may be soaked by means of a shower following the chilling operation. In any event, the stuffed casings are chilled for an extended period in accordance with standard commercial practice prior to peeling. The ease of peeling of the treated casings from the sausages encased therein is compared with the ease of peeling of untreated control casings.

In the case of bologna sausages, the quaternary ammonium salts used to treat the casings are preferably added to the soak water used to make the casings flexible in preparation for stuffing. The casings are stuffed with the usual bologna paste or emulsion and given a normal cooking and smoking period. Alternatively, the bologna paste or emulsion may be stuffed in an untreated casing and the stuffed sausage soaked briefly in a solution of one of the aforementioned quaternary ammonium salts to facilitate removal of the casing from the sausage. The ease of peeling of the treated casings from the sausage encased therein is then compared with the ease of peeling of untreated control casings. As will be noted in the following examples, the treated casings invariably are peeled more readily using standard commercial peeling equipment than are the untreated controls. In cases where hand peeling of the casing is used the treated casings peel more readily and do not pull off meat from the outside of the sausage as is the case with untreated control casings.

The following non-limiting examples are illustrative of the scope of this invention:

EXAMPLE 1

A solution is prepared by dissolving about 1 part n-dodecyl trimethyl ammonium chloride ($C_{12}H_{25}(CH_3)_3NCl$) in 10 parts of water.

Casings are treated in accordance with this invention as part of a standard commercial frankfurter manufacturing process. Clear cellulose frankfurter casings in shirred form, are stuffed with a frankfurter paste or emulsion on a commercial stuffing machine. The normal stuffing operation is such that the shirred casing is stuffed out from a shirred length of the order of 10–20 inches out to an extended length of 80–160 feet in the matter of a few seconds. As the casing is being stuffed it passes through a commercial linking machine to form a string of frankfurter links.

The string of frankfurter links is passed through the treating solution prepared above to soak the casings on the frankfurters and provide a concentration of at least 50 ppm. salt in the casing. The quaternary salt saturated in the wall of the casing is soluble and capable of interacting with components of the frankfurter emulsion to modify the surface characteristics of the sausage and facilitate removal of the casing. Part of the frankfurter links are by-passed around the treating bath to provide a control for comparison with the treated casings. The string of frankfurter links, both treated and untreated is then placed in a chill room for a period of 24–48 hours or longer if needed. The thoroughly chilled sausages are then brought into a highly humid room where moisture condenses on the casing to facilitate casing removal. The chilled, sweated frankfurter links are then passed through a commercial peeling machine which removes casing from the individual links.

As an extreme test of the efficacy of this invention, some of the controls and treated casings, stuffed with frankfurter emulsion, are removed from the chill room after about 2 ½ hours to evaluate the peeling of casing under these conditions. The control casing can not be peeled from frankfurters using commercial peeling equipment and, in fact, attempts to peel the casing manually result in tearing meat from the surface of the frankfurters. The treated frankfurter casings, i.e., frankfurters passed through the treating solution, peel very well from the frankfurters using standard commercial machinery with very few peeling misses. Furthermore, the sausages missed on the peeling machine can be peeled by hand without pulling meat from the surface of the frankfurters.

When frankfurters formed in control casings and treated frankfurters are refrigerated for the full 24–48 hour period there is a substantial improvement in the performance of the untreated controls. Nevertheless, the treated casings are peeled with substantially fewer misses even under these conditions. It is thus seen that the use of the treating solution improves substantially the peeling performance under normal processing conditions and further permits the peeling of casing from the frankfurters after a much shorter chill period. The use of the treating solution on the stuffed frankfurters permits the meat packer to maintain a lesser inventory in the chill room and/or a substantial increase in throughput as a result of the improved peelability of casing after a short chill period.

EXAMPLE 2

A treating solution is prepared by dissolving about 1 part n-octyl trimethyl ammonium chloride ( n-$C_8H_{17}(CH_3)_3NCl$ ) in about 10 parts distilled water. This treating solution is used in the treatment of frankfurter sausages during a conventional frankfurter manufacturing process as previously described.

Frankfurters are prepared and processed in this example using the conditions described in Example 1. A string of frankfurter links is passed through the treating solution and subsequently smoked and cooked, chilled and peeled. Some strings of frankfurter sausages are sent directly to cooking and smoking without passing through the treating solution. These are the untreated controls. After 2 ½ hours in the chill room, the treated casings can be readily removed from the frankfurters using commercial fast peeling machinery while the untreated controls can not be removed. After a full 24–48 hour chill period the treated casings generally exhibit substantial improvement in peeling as compared to untreated controls.

EXAMPLE 3

A treating solution is prepared by dissolving 1 part di-n-butyl dimethyl ammonium sulfate ( $[(n-C_4H_9)_2(CH_3)_2N]_2SO_4$ ) in about 10 parts distilled water.

The treating solution prepared above is used in soaking fibrous casing in preparation for the manufacture of bolognas. This solution is used in place of the usual pre-soak for softening the casing in preparation for stuffing. The soaked casing is then used in a conventional process for manufacture of bologna sausages.

Treated casings, together with untreated control casings (i.e., casings soaked in plain water) are used in the preparation of bologna sausages. The casings are stuffed with bologna paste or emulsion and are subsequently cooked and smoked. Eventually, the casing is peeled from the bolognas prior to slicing the sausage in preparation for packaging and marketing. The untreated control casings stick to the surface of the sausage and tend to tear portions of meat from the surface. The treated casings peel readily from the sausage without tearing away meat.

EXAMPLE 4

A treating solution is prepared by dissolving 1 part cetyl pyridinium chloride

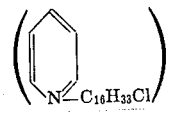

in about 20 parts distilled water.

The treating solution is used in the treatment of stuffed and linked frankfurters substantially as described in Examples 1 and 2. The treated casings, together with untreated controls, are evaluated by peeling using commercial peeling machines after various intervals in the chill room following the cooking and smoking. The treated casings peel substantially better than untreated casings after a 2 ½ hour chill period. After the full 24–48 hour chill period the treated casing still peels substantially better when the frankfurters are peeled on commercial fast peeling machines.

EXAMPLE 5

A treating solution is prepared by dissolving 1 part $ClC_6H_{13}(CH_3)_2NCH_2CH_2CH_2N(CH_3)_2C_6H_{13}Cl$ in about 20 parts distilled water.

This treating solution is used in the preparation of frankfurters as described in Examples 1 and 2, except that the solution is applied to the stuffed and linked frankfurters in a conventional shower operation rather than by dipping in a treating bath. From the shower operation the frankfurters are passed to the smoking and cooking operation and subsequently to the chill room.

The treated casings are more easily removed from frankfurters than are untreated control casings both after a short chill period and after a full 24–48 hours chill period. After the short chill period, the treated frankfurters exhibit an extremely small proportion of peeling misses using commercial fast peeling machinery. After the short chill period it is virtually impossible to remove untreated control casings using standard fast peeling machinery.

EXAMPLE 6

The casing treating solution is prepared by dissolving 1 part ($HOC_2H_{43}N\ C_{20}H_{41}Cl$ in about 5 parts distilled water.

This treating solution is used in the treatment of stuffed and linked frankfurters substantially as described in Examples 1 and 2. The treated casings, together with untreated controls, are evaluated by peeling using commercial peeling machines after various intervals in the chill room following the cooking and smoking. The treated casings peel substantially better than untreated casings after a 2 ½ hour chill period. After the full 24–48 hours chill period the treated casing still peels substantially better when the frankfurters are peeled on commercial fast-peeling machines.

EXAMPLE 7

The treating solution is prepared by dissolving 1 part

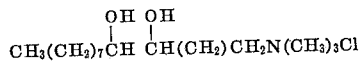

in about 20 parts distilled water.

This treating solution is used to treat stuffed and linked frankfurters substantially as described in Examples 1 and 2. Treated casings peel substantially better than untreated casings after a 2 ½ hour chill period or after a full 24–48 hour chill period on commercial fast-peeling machines.

EXAMPLE 8

A casing treating solution is prepared by dissolving 1 part Cl(CH$_3$)$_3$,ch$_2$)$_{12}$N(CH$_3$)$_3$Cl in about 10 parts distilled water.

This treating solution is used in the preparation of bologna sausages as described in Example 3. The casings are stuffed with bologna paste or emulsion and are subsequently cooked and smoked. Eventually, the casing is peeled from the bolognas prior to slicing in preparation for packaging and marketing. The untreated control casings stick to the surface of the sausage and tend to tear portions of the meat from the surface. Treated casings peel readily from the sausage without tearing away the meat.

EXAMPLE 9

A treating solution is prepared by dissolving 1 part

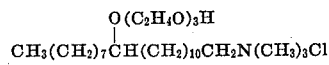

in about 15 parts distilled water.

The treating solution is used in the treatment of frankfurters as described in Example 5. The solution is applied during the conventional shower operation rather than by a separate dip. The treated casings are more easily removed from the frankfurters than are untreated controls, both after a short chill period and after a full 24–48 hour chill period.

EXAMPLE 10

A treating solution is prepared by dissolving 1 part

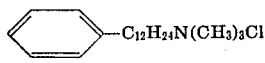

in about 12 parts distilled water.

The treating solution is used in the treatment of frankfurters as described in Example 5. The solution is applied during the conventional shower operation rather than by a separate dip. The treated casings are more easily removed from the frankfurters than are untreated controls, both after a short chill period and after a full 24–48 hour chill period.

From the foregoing examples we have demonstrated that the saturation and impregnation of synthetic sausage casings with solutions of non-toxic quaternary ammonium salts is generally effective to provide improved peeling of the casing from frankfurters and similar sausages. The treatment may be applied to the casing prior to stuffing or to the stuffed sausage. While the process has been described as applied to cellulosic casings it should be understood that the compounds mentioned may be applied to any synthetic sausage casings such as casings of collagen, alginates, starch, dextran, polyvinyl alcohol, etc., where improved peelability of the casing is desired.

Without limiting ourselves to any particular theory of operation of the invention, we believe that the compounds used in the treating solution may function to tan, harden, or denature proteinaceous components of the sausage emulsion or may interact with fatty components to provide soap-like derivatives which improve the peelability or release characteristics of the casing at the point of contact with the sausage encased therein. The compounds which are used in the treating solution must be soluble in water or in the sausage emulsion under conditions of use so that they are mobile or readily leached or absorbed from the casing into or onto the surface of the sausage to interact with the surface layer or "skin" of the sausage on contact therewith to provide the improved release properties. The compounds in the treating solution are uniformly impregnated or saturated throughout the casing and are easily applied from outside the casing, thus making possible the easy peeling of the casing. Casings treated in accordance with this invention not only provide improved peelability but also permit the peeling of sausages at an earlier point in the processing, thus increasing the over-all rate of processing of the sausages through the meat packing plant.

We claim:

1. A process for treating an artificial sausage casing to improve the peelability of the casing from a sausage stuffed and processed therein comprising impregnating said casing after drying but prior to stuffing or impregnating said casing on a sausage after stuffing with a solution of a non-toxic soluble quaternary ammonium salt capable of interacting with one or more components of the sausage paste or emulsion to modify the surface of the sausage in contact with the casing.

2. A process as defined in claim 1 in which the quaternary ammonium salt is (a) a simple quaternary ammonium salt of the formula
   (NR$_4$)$_n$X (b) a pyridinium salt of the formula

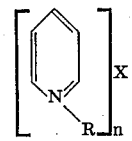

(c) a quaternary salt of ethylene amine of the formula

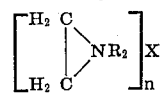

(d) a quaternary salt of diamine of the formula
   [R$_3^1$N—R$^2$—NR$_3^1$]$_n$2X (e) a quaternary diamine salt derived from piperazine of the formula

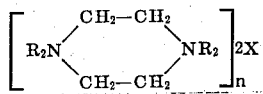

(f) a quaternary salt of hydrazine of the formula
   [R$_3$H—NR$_3$]$_n$2X wherein R and R$^1$ are C$_1$–C$_{20}$ alkyl, alkenyl, cycloalkyl, or aryl alkyl, including straight chain and branched chain forms, both unsubstituted and including alkyl, cycloalkyl, aryl, halo, hydroxy, ethoxy, or propoxy substituents, and R$^2$ is C$_2$–C$_{20}$ alkylene or alkenylene, unsubstituted or containing inert substituents, X is a non-toxic salt anion and $n$ is the valence of X.

3. A process as defined in claim 1 in which said quaternary ammonium salt is present in a concentration sufficient to provide a salt concentration in the casing of at least 50 ppm.

4. A process as defined in claim 1 in which said casing is soaked in said treating solution after drying but prior to stuffing.

5. A process as defined in claim 1 in which said casing is stuffed with sausage paste or emulsion and then soaked in or showered with said treating solution prior to cooking, smoking, and/or chilling.

6. A process as defined in claim 2 in which said casing is soaked in said treating solution after drying but prior to stuffing.

7. A process as defined in claim 2 in which said casing is stuffed with sausage paste or emulsion and then soaked in or showered with said treating solution prior to cooking, smoking, and/or chilling.

* * * * *